United States Patent [19]

Peng

[11] Patent Number: 5,600,120
[45] Date of Patent: Feb. 4, 1997

[54] HELICAL SCANNING PATTERN GENERATOR

[75] Inventor: Ke-Ou Peng, Delft, Netherlands

[73] Assignee: Opticon Sensors Europe B.V., Hoofddorp, Netherlands

[21] Appl. No.: 653,993

[22] Filed: May 28, 1996

Related U.S. Application Data

[63] Continuation of Ser. No. 309,883, Sep. 20, 1994, abandoned.

[30] Foreign Application Priority Data

Sep. 21, 1993 [EP] European Pat. Off. ............ 93202734

[51] Int. Cl.⁶ .................................................. G06K 7/10
[52] U.S. Cl. ........................ 235/467; 235/464; 235/472
[58] Field of Search ................................ 235/467, 472, 235/464

[56] References Cited

U.S. PATENT DOCUMENTS 4,230,393  10/1980  Burke, Jr. .
4,282,431  8/1981   Anthony, Jr. et al. ................. 235/467
4,838,632  6/1989   Manian .
4,871,904  10/1989  Metlitsky et al. .
5,099,110  3/1992   Shepard et al. ........................ 235/467

FOREIGN PATENT DOCUMENTS 0456095  11/1991  European Pat. Off. .
0551666  7/1993   European Pat. Off. .
2255650  11/1992  United Kingdom .

*Primary Examiner*—Harold Pitts
*Attorney, Agent, or Firm*—Young & Thompson

[57] ABSTRACT

Scanning apparatus to scan an object by means of a light beam, including at least one mirror (2), which, during operation, is driven by a drive to make a combined movement of a continuous rotation around an axis of rotation (63) and an oscillating movement relative to the axis of rotation (63), the drive including a rotation drive (7, 8) and an oscillating drive (11, 12), both drives being controlled in such a way that the continuous rotation and the oscillating movement of the mirror are controlled independently. Thus the oscillating drive oscillates only the mirror. The light beam is thus parallel to or coincident with the axis of rotation.

13 Claims, 8 Drawing Sheets

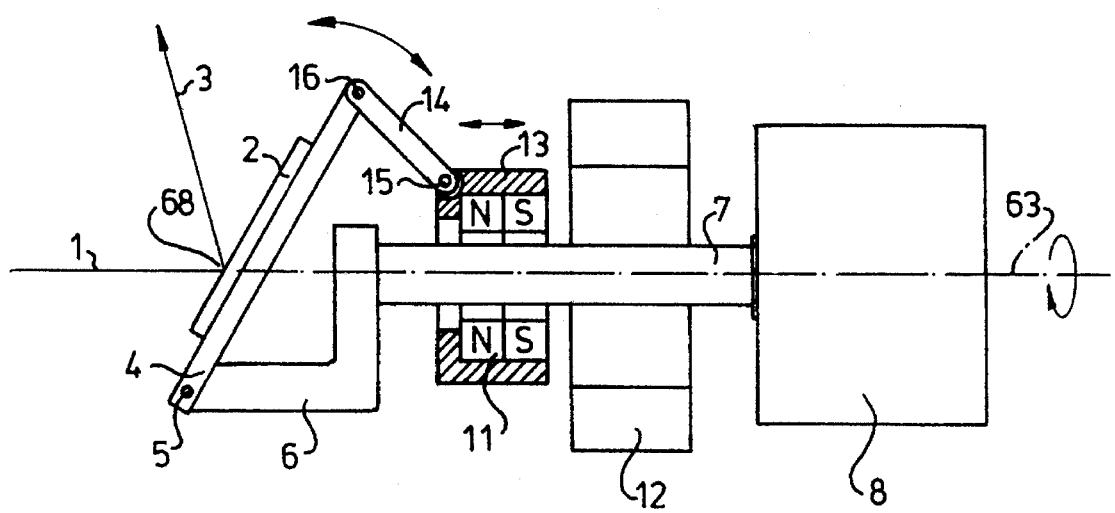
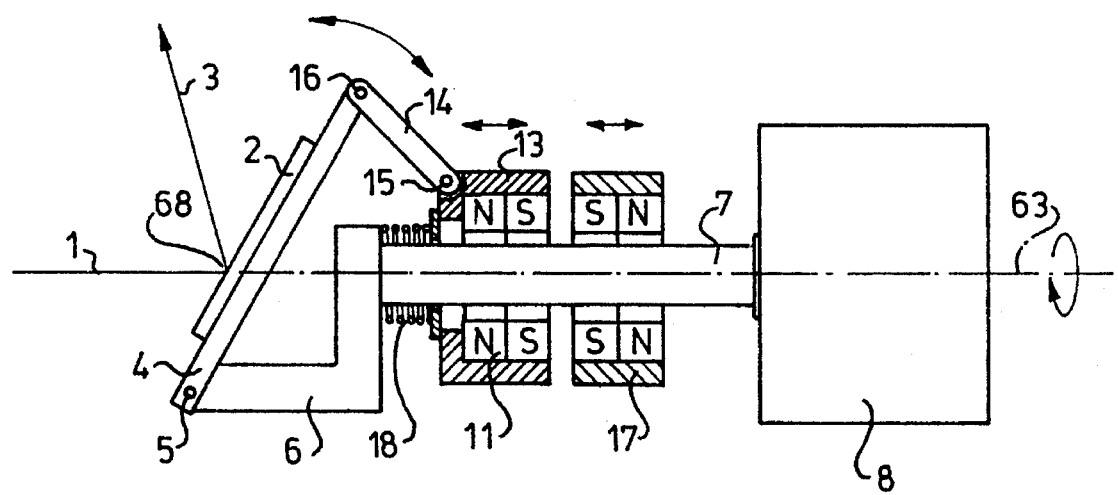

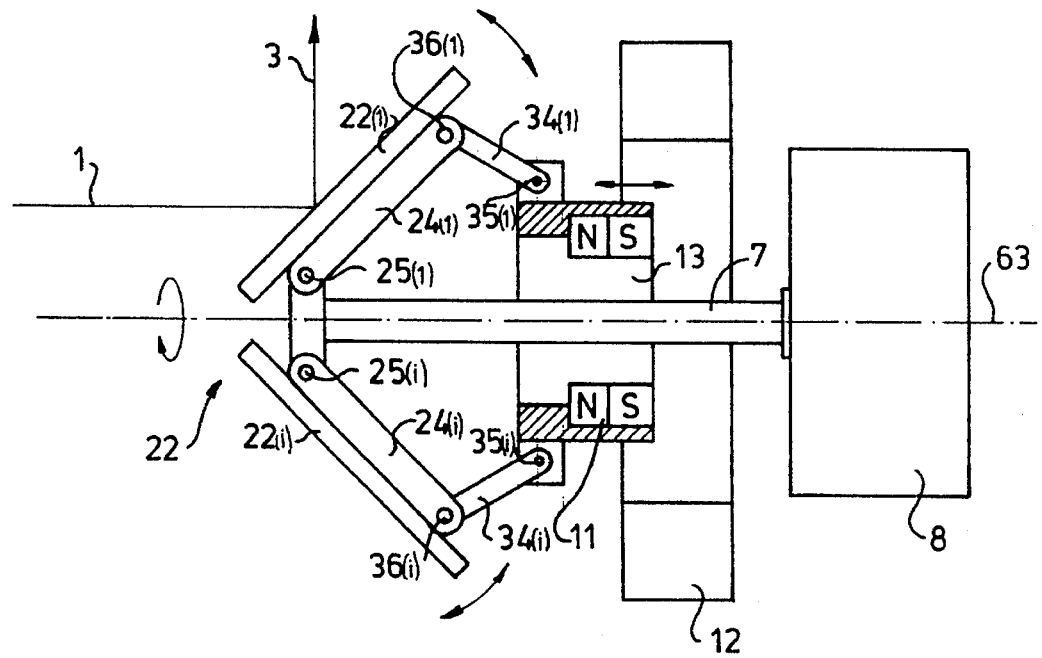
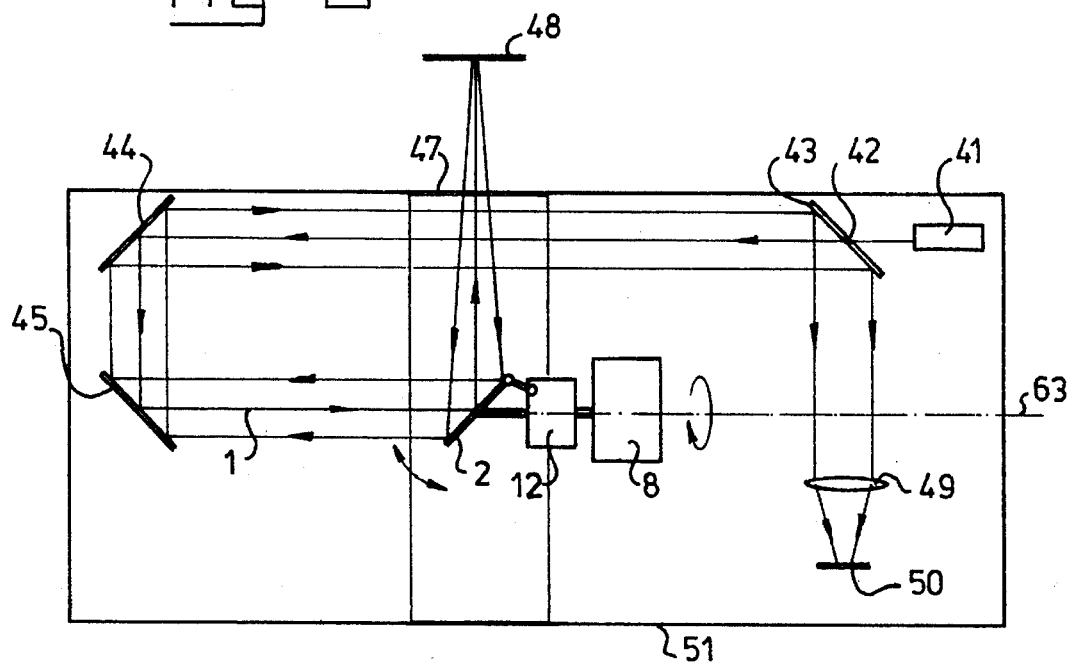

HELICAL SCANNING PATTERN GENERATOR

This application is a continuation of application Ser. No. 08/309,883, filed Sep. 20, 1994, now abandoned.

BACKGROUND OF THE INVENTION

The present invention relates to a scanning apparatus to scan an object by means of a light beam comprising at least one mirror, which, during operation, is driven by driving means to make a combined movement of rotation around an axis of a continuous rotation and an oscillating movement relative to the axis of rotation.

Such a scanning apparatus is known form GB-A-2.255.650, which shows various scanning devices able to produce generally parallel scanning lines on an object to be scanned. In all the scanning devices shown, at least one tiltable mirror is used. In one embodiment (FIG. 10) a rotatable polygon having mirror facets is shown, which is driven in such a way that, during operation, each of the facets is not only made to rotate but also made to oscillate, since the entire polygon is made to oscillate during its rotation. However, in the known device the oscillating movement of the entire polygon is coupled to the rotating movement. So, the light beam incident upon each of the facets will generate a fixed, curved scanning line. This scanning apparatus is not able to generate a helical scanning pattern or sections thereof, in which the pitch of the pattern, i.e. the mutual distance between neighbouring scanning lines of the pattern may be controlled. Moreover, no change of direction of the generated scanning lines is possible.

EP-A-0.456.095 discloses the application of a mirror in a bar code reading device, which mirror is made to oscillate in two perpendicular directions. The arrangement according to FIG. 3 of this European patent application is the one most close to the present patent application. The mirror can be caused to rotate by a motor and can be caused to oscillate by electromagnetic driving means. However, the output shaft of the motor does not continuously rotate but oscillates in alternate directions. Therefore, the output shaft to which the mirror is connected is not able to rotate in one direction only. The rotating movement of output shaft is restricted by a torsion spring connected to the other end of output shaft allowing only an oscillating alternating movement of the output shaft.

U.S. Pat. No. 4,838,632 discloses a two-dimensional beam scanner in which a mirror is able to be moved in two perpendicular directions. The mirror is pivotable about a first axis A and can be rotated about a second axis B perpendicular to the axis A by a stepper motor which is able to drive the mirror about the axis B in alternate directions. The stepper motor only drives the mirror in a stepping mode by equal angular steps. Therefore mirror is not driven continuously in one direction only about axis of rotation B. Moreover, there is only shown a scanning plane of limited dimensions (FIG. 3), which implies that the total amount of rotation about axis B is limited and that the rotation will be in alternate directions only, as indicated by a double arrow in the figures. No cylindrical scanning plane surrounding the scanner is either indicated or suggested. Besides, in the description of U.S. Pat. No. 4,838,632 it is not explained how the mirror can be oscillated about its pivot axis A; the only indication given is that such an oscillating movement may done by "any means known in the art" and that the mirror is typically a "galvanometer mirror" (column 2, lines 66–68), whereas causing a mirror to make a combined movement of two single perpendicular movements is not easy.

SUMMARY OF THE INVENTION

It is a primary object of the present invention to provide a scanning apparatus able to provide at least segments of a helical scanning pattern, in which the pitch of the pattern may be varied, in order to read codes at the inside of hollow cylindrical objects.

It is a further object of the present invention to provide a scanning apparatus by which bar codes can be read located at an arbitrary position and having an arbitrary orientation with respect to the scanning apparatus.

Therefore, the invention is directed to a scanning apparatus as defined above wherein the driving means comprises rotation driving means and oscillating driving means, both driving means being controlled by control means in such a way that the continuous rotation and oscillating movement of the mirror are controlled independently.

By these measures the light beam after being reflected by the rotatable and tiltable mirror is able to generate at least segments of a helical scanning pattern, the pitch of which being variable by varying the mutual ratio between rotation speed of the mirror and oscillating speed of the mirror. For instance, bar codes at the inside of hollow cylindrical objects are easy to read by such a scanning apparatus, since always one scanning line can be made to pass the entire code.

In a first embodiment of the invention, during operation, the light beam incident upon the mirror propagates substantially along the axis of rotation of the mirror. By the application of this measure a continuous helical scanning pattern may be generated, thus enhancing the change of detecting the code to be read.

In a second embodiment of the invention the scanning apparatus comprises a rotatable polygon having N tiltable, reflective facets and wherein, during operation, the light beam incident upon subsequent facets of the polygon propagates along a path substantially parallel to the axis of rotation of the polygon. By means of such a polygon segments of a helical scanning pattern may be generated, the pitch of which being variable by varying the mutual ration between the rotation speed of the polygon and the oscillating speed of the individual facets.

According to the invention the oscillating driving means may comprise a spring means.

In a further embodiment the mirror is tiltable around first pivoting means and the oscillating driving means comprises first magnet means connected to the mirror and means to exert a magnetic force on the first magnet means in order to move them in an axial direction relative to the axis of rotation. The means to exert a magnetic force on the first magnet means may comprise a coil to be activated by an electric current. However, alternatively, the means to exert a magnet force on the first magnet means may comprise the magnet means driven by mechanical driving means to drive second magnet means in a direction substantial parallel to the axis of rotation.

In embodiments which may directly generate a helical scanning pattern (or parts thereof) on an object to be scanned the scanning apparatus, preferably, comprises a housing surrounding the mirror and the driving means and comprising a window at least partially surrounding the mirror allowing the light beam to generate at least segments of a helical scanning pattern on the object to be scanned after being reflected by the mirror.

In further embodiments of the invention the generated helical scanning pattern may, advantageously, be used to generate a star-like scanning pattern, for instance, to read bar codes on substantial flat surfaces, having unknown orientations and positions. Such a scanning apparatus according to the invention may comprise a mirror array surrounding the mirror to receive the light beam after being reflected by the mirror in order to generate a scanning pattern on an object to be scanned.

However, alternatively, such a scanning apparatus may comprise a mirror array surrounding the mirror to receive the light beam after being reflected by the mirror and a further mirror, which is rotatable around the axis of rotation and arranged to receive the light beam after being reflected by the mirror array in order to generate a scanning pattern on an object to be scanned. By such an arrangement, the distance between the scanning apparatus and the object to be read is less critical for the scanning pattern.

In a last embodiment of the invention the scanning apparatus comprises a further rotatable, tiltable mirror connected to further rotation driving means and to further oscillating driving means, both further rotation and oscillating driving means being controlled by further control means, wherein, during operation, the light beam is directed to the mirror along a path having a first angle of inclination relative to the axis of rotation of the mirror in order to generate a reflected light beam which propagates along a conic surface to the further mirror, which reflects the reflected light beam in order to generate a scanning pattern having a height and a width which are variable by varying at least one of the following variables selected from the following group of variables: rotation speed of the mirror, rotation speed of the further mirror, oscillating movement of the mirror, and oscillating movement of the further mirror. By applying these measures variable scanning patterns may be generated.

A scanning arrangement in which two mirrors are used, each being rotatably connected to its respective motor, and each having its own angel of inclination with respect to its own axis of rotation is known from U.S. Pat. No. 4,871,904. By varying the ratio between the speeds of rotation of both of the mirrors the generated scanning pattern may be varied. However, in the known device the angles of inclination are fixed, so, at a given distance between an object to be scanned and the scanning device the generated scanning field may be too limited.

BRIEF DESCRIPTION OF THE DRAWINGS

The invention will be further explained by reference to the accompanying drawings, which shown some embodiments of the principle teaching of the present invention.

FIG. 5 shows an embodiment of the rotating mirror which is given a tilting movement by electromagnetic means;

FIG. 6 shows another embodiment of a rotating mirror which is given a tilting movement by magnetic means;

FIG. 7 shows a rotating polygon the mirror facets of which are independently tiltable by electromagnetic means;

FIG. 8 shows an embodiment of a scanning apparatus comprising a helical scanning pattern generator according to any of the FIGS. 2–6;

DETAILED DESCRIPTION OF THE EMBODIMENTS

Figure 1A:
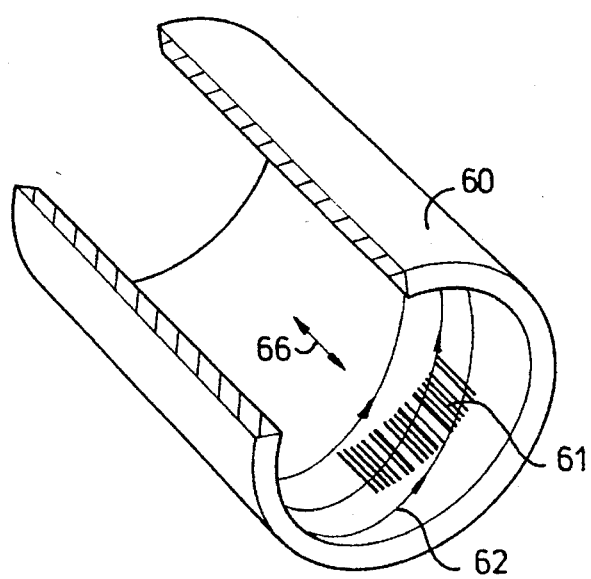
FIGS. 1a, b, c show various directions of bar codes at the inside of an cylindrical object.

Bar codes at the inside of a cylindrical object may have various directions, as shown in FIG. 1. The cylindrical object shown in FIG. 1a has a bar code 61, which is substantially directed along a circle, the surface of the circle being substantially perpendicular to the central axis (not shown) of the cylindrical object 60. A scanning pattern which is useful to scan the bar code is depicted by reference number 62 and is essentially a helical scanning pattern. The scanning pattern is preferably written by a laser beam. The scanning spot of the laser beam should meet at least the condition that it moves across a bar code to be read at least once continuously. In practice, this condition is met when:

1. the scanning spot is continuous over at least $4\pi$ radians in such a way that any bar code with full length in an inner circle and at an arbitrary position within the circular object can be read;
2. the scanning pitch 66, i.e. the interval between two neighbouring scanning rings, is less than half the width of the bar code 61 in order to allow the scanning locus to write a scanning line across at least each symbol of the bar code 61 to be detected.

Figure 1B:
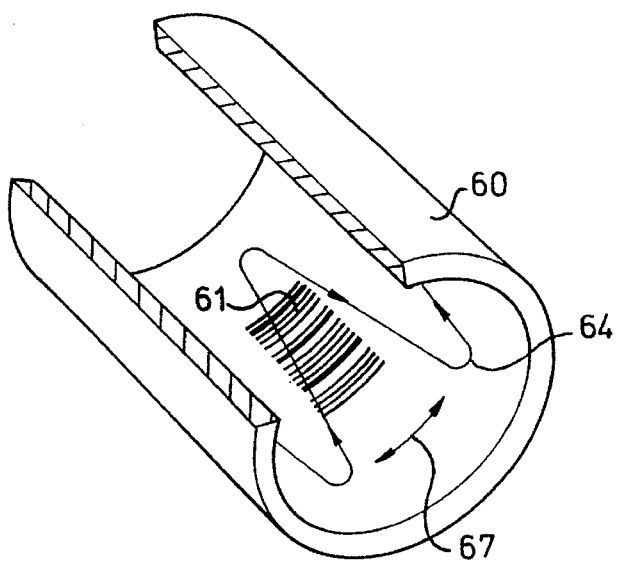

FIG. 1b shows a situation in which a bar code is directed substantially along the axial direction of the circular object: i.e. a bar code 61 is parallel to the central axis 63 of the cylindrical object. In the situation of FIG. 1b, the scanning spot should meet at least the condition that it moves across a bar code to be read at least once continuously. In practice, this condition is met when:

1. the scanning spot is continuous along the entire inside of the circular object in order to allow the bar code 61 to be read at any position at the inside of the circular object;
2. the scanning pitch 67, i.e. the interval between two neighbouring scanning lines 64, is less than half the width of the bar code 61 in order to allow at least one scanning line to pass over all the symbols of the bar code 61.

Figure 1C:
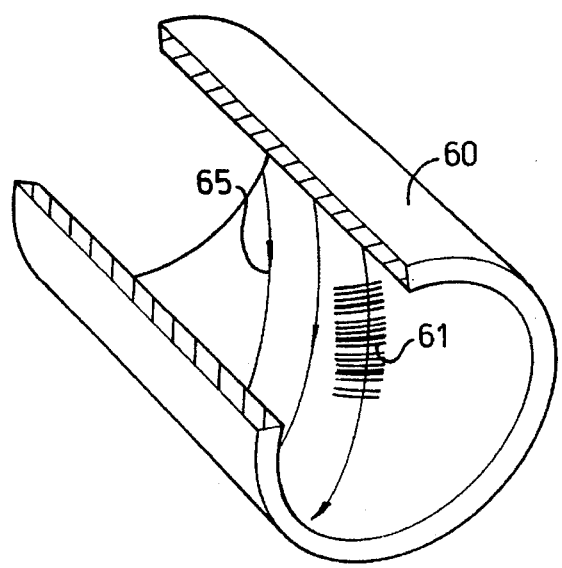

However, the bar code 61 may also be directed along a direction between the circular direction shown in FIG. 1a and the axial direction shown in FIG. 1b. Such a situation is shown in FIG. 1c. The scanning locus of the laser beam generating the scanning pattern 65 of FIG. 1c must meet the same conditions as mentioned above with respect to the situation shown in FIG. 1a.

Figure 2:
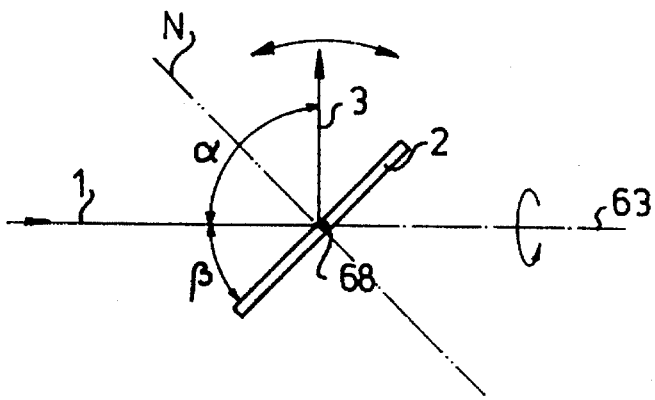
FIG. 2 shows the basic principle of the scanning apparatus according to the invention.

To generate scanning patterns 62, 64, 65 of FIGS. 1a, b, c, a simple rotating mirror which is forced to make an independent tilting movement may be used, as is shown in FIG. 2. The mirror 2, shown in FIG. 2, rotates around an axis of rotation 63, while a laser beam 1 impinges upon the mirror 2 substantially at the point of intersection 68 of the axis of rotation 63 and the mirror 2. The impinging (laser) beam 1 may propagate along the axis of rotation 63, however, the propagation path of impinging beam 1 and axis of rotation 63 do not need to coincide, i.e. the laser beam 1 may, for instance, propagate along a path substantially parallel to the axis of rotation 63. The impinging laser beam 1 is reflected by the mirror 2 to generate a reflected laser beam 3. As the mirror 2 rotates around axis of rotation 63 the reflected laser beam 3 follows a circular path in a plane determined by the angle of incidence β of the laser beam 1 upon the mirror 2. If during rotation of the mirror 2 around the axis of rotation 63 the angle of incidence β is changed by tilting the mirror the reflected laser beam 3 will follow a helical path around the axis of rotation 63. In other words, in the description of the present invention, "tilting" of the mirror 2 is defined as moving the mirror 2 in such way that a normal N to the surface of the mirror 2 (see FIG. 2) through point 68 is rotated around point 68 within a surface defined by the normal N and the axis of rotation 63. By defining "tilting" in such a way practical embodiments of the present invention may be easily designed. In practice, a scanning line is not generated once but several times by tilting mirror 2 in alternate opposite directions, i.e. by oscillating mirror 2 within the plane defined by the normal N and axis 63.

Any of the scanning patterns 62, 64, 65 shown in FIGS. 1a, 1b, 1c may be generated by controlling the tilting speed relative to the speed of rotation. When the speed of rotation is much higher than the speed of the tilting movement the helical scanning pattern of FIG. 1a will be obtained. By increasing the speed of the tilting movement relative to the speed of rotation the scanning pattern 65 of FIG. 1c will be obtained. By selecting the speed of the tilting movement to be substantially larger than the speed of rotation scanning patterns like scanning pattern 64 of FIG. 1b may be generated. It is evident that any orientation of the helical scanning pattern may be obtained by adjusting the ratio of the tilting speed and the rotation speed.

In FIG. 2 the situation is shown that the incident laser beam 1 propagates along axis of rotation 63. However, it is possible to direct the impinging laser beam 1 to the mirror 2 along a path substantially perpendicular to axis of rotation 63, where the angle between the normal N and the axis of propagation 63 is close to $\pi/4$ radians. Then, by rotating and tilting the mirror 2 the scanning spot may write a circular path on an object, however, the radius of which is increasing or decreasing continuously.

In a further embodiment of the arrangement according to FIG. 2, the angle between the normal N and the axis of rotation 63 is close to $\pi/2$ radians and the propagation path of laser beam 1 is substantially perpendicular to the axis of rotation 63. Then, by rotating and tilting the mirror 2 a segment of a helical scanning pattern will be produced, however, the scanning speed will be doubled relative to the rotation speed of the mirror 2.

Figure 3:
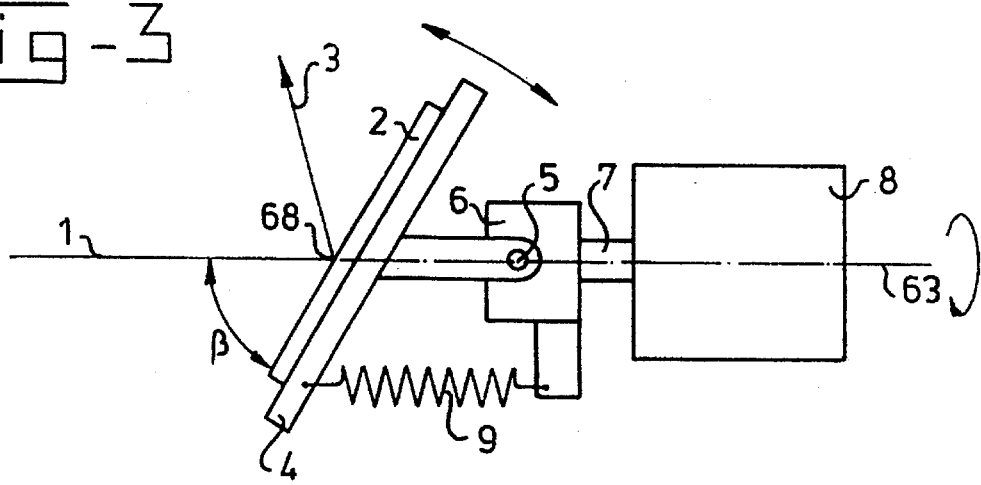
FIGS. 3, 4 show different embodiments of a rotating mirror which is also given a tilting movement by means of a spring element.

FIG. 3 shows a first embodiment of the principles of the present invention as schematically depicted in FIG. 2. In the scanning pattern generator according to FIG. 3 the mirror 2 is driven by a motor 8 which drives the mirror 2 by means of a rotation shaft 7. The laser beam 1 impinges upon the mirror at point 68 at the mirror 2. In dependence on the movement of the mirror 2 the reflected beam 3 will describe a circular or helical pattern, as explained above. The mirror 2 is fixed to a frame 4, which is connected to a joint 6 by means of pivot means 5. Joint 6 is fixed to the rotation shaft 7 of motor 8. A spring 9 is fixed at one end to the joint 6 and at its other end to the frame 4 as shown in FIG. 3.

During rotation, the reflected laser beam 3 will scan a circular pattern around the first axis 63. The mass of the rotating parts 2 and 4 will generate a centrifugal force resulting in a tilting movement of the mirror 2. In other words, the angel of incidence β depends upon the rotation speed of the mirror 2. To vary the actual helical scanning pattern, the rotation speed of the motor 8 will have to be varied.

Figure 4:
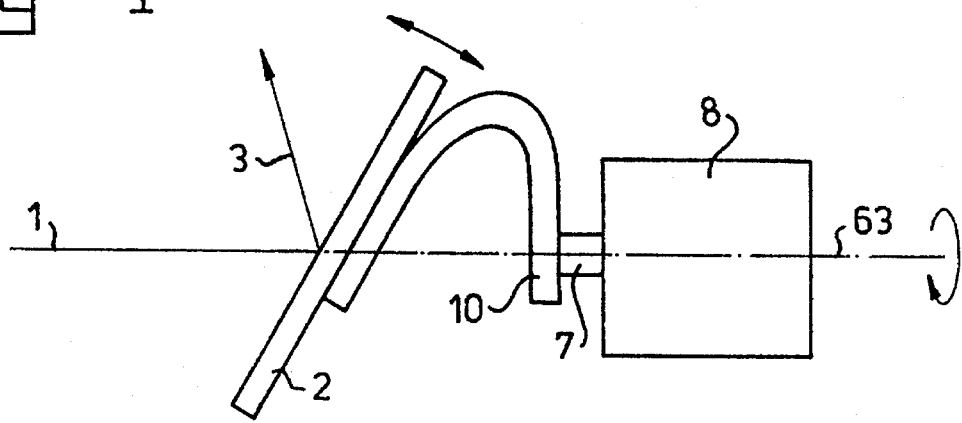

Instead of the pivot means 5, also a simple elastic connection may be used, as is shown in FIG. 4. In the arrangement according to FIG. 4 the mirror 2 is fixed to the rotation shaft 7 of motor 8 by means of a flat bent spring 10. Again, in the arrangement according to FIG. 4, the speed of tilting of the mirror 2 is determined by the speed of rotation of the mirror 2 which may be varied by motor 8. The ratio of the tilting speed and rotation speed of the mirror 2 may be varied by adding additional mass to the mirror 2 at appropriate positions. Both the scanning device according to FIG. 3 and the scanning device according to FIG. 4 can only generate helical scanning patterns by varying the speed of motor 8. However, in this embodiment to change the tilting angle β of the mirror 2 the motor speed has to be changed. That causes a variation in linear speed of the scanning spot on a bar code and requires an increased bandwidth of the detection electronics used (not shown). Such a situation may not be convenient.

It is preferred to have a uniform speed of rotation and to control the tilting movement of the mirror, independent on the speed of rotation. This may be obtained by a helical scanning pattern generator as shown in FIG. 5. The laser beam 1 impinges upon the mirror 2 at the point of intersection 68 and is reflected to become reflected laser beam 3. Mirror 2 is again fixed to the frame 4. The frame 4 is connected to the joint 6 by means of pivot means 5. Joint 6 is fixed to the rotation shaft 7 of motor 8. During rotation of the motor mirror 2 will continuously rotate around the axis of rotation 63. Frame 4 is connected to a rod 14 by means of further pivot means 16 being arranged at a side of the frame 4 opposite to the position of pivot means 5. Rod 14 is connected to a housing 13 by means of other pivot means 15. The housing 13 comprises a magnet 11. Preferably, the magnet 11 has a circular shape and has a hole through which the rotation shaft 7 extends. The magnet 11 may, together with the housing 13, slide along rotation shaft 7. A coil 12 is provided which may be activated by an electric current to generate an electromagnetic force to attract or repel the magnet 11. By the provision of coil 12 the housing 13 and the magnet 11 may be forced to make a sliding movement along the rotation shaft 7 resulting in a tilting movement of mirror 2, which is independent of the speed of rotation of motor 8. The combined movement of rotation generated by motor 8 and the tilting movement generated by current flowing through coil 12 results in a helical scanning pattern as described above.

Attractive and repelling forces upon the magnet 11 may also be generated by means of another magnet, as is shown in FIG. 6. Instead of the coil 12 shown in FIG. 5 a circular magnet ring 17 is used, also having a hole through which the rotation shaft 7 passes. Preferably, as shown in FIG. 6, the poles of magnets 11 and 17 have opposite signs in order to avoid physical contact between magnets 11 and 17 that would otherwise result from attracting forces between magnets 11 and 17. The arrangement shown in FIG. 6 also comprises spring means 18 which exert a driving force on magnet 11 in the right direction of FIG. 6, whereas the magnet 17 exerts a driving force in the left direction of FIG. 6. By providing mechanical driving means (not shown) to the magnet 17 the force exerted on the magnet 11 by magnet 17 mat be varied by sliding the magnet 17 along a rotation shaft 7. Therefore, mirror 2 in the arrangement according to FIG. 6 may be rotated by motor 8 and may be tilting independently by the sliding movement of magnet 17 along the rotation shaft 7.

It is not strictly necessary to provide a circular magnet 11. Magnet 11 may for instance be a magnet rod within a hollow part of the end of shaft 7, while the magnetic rod is slidable within the hollow part of the shaft 7. In such an arrangement (not shown) the coil 12 is provided around the hollow part of the shaft 7, which hollow part, then, of course is non-ferromagnetic.

In the arrangements according to FIGS. 5 and 6, the frame 4 may be fixed to joint 6 by an elastic component. Then, when the tilting angle is required not to be large, the housing 13 may be directly fixed to the frame 4 without the intervention of pivots 15, 15 and rod 14. In such a case, the hole of housing 13 through which shaft 7 passes should be large enough to allow the housing to be tilted without touching the shaft 7.

FIG. 7 shows and embodiment of the present invention in which a polygon 22 having N reflective facets 22(1) . . . 22(N) is used. FIG. 7 shows a cross section through the polygon 22 which has a symmetrical shape relative to the axis of rotation 63, as is known to a person skilled in the art. In the embodiment according to FIG. 7 the incident light beam 1 does not propagate along the axis of rotation 63 but along a path substantially parallel to it. The incident laser beam 1 is reflected by one of the facets 22(i) of the polygon 22 to become reflected laser beam 3. It is to be observed that reflected laser beam 3, in this embodiment of the invention, is only able to generate a part of a circular or helical scanning pattern, since laser beam 1 only impinges on each facet 22(i) of the polygon 22 during a part of a rotation cycle. Facets 22(i) are fixed to frames 24(i). Frames 24(i) are connected to the rotation shaft 7 by means of pivots 25(i). At the opposite side each frame 24(i) are connected to a rod 34(i) by means of a further pivot 36(i). Pivots 35(i) act as interconnection means between rods 34(i) and the housing 13 comprising magnet 11. The housing 13 together with the magnet 11 can move to and fro along the rotation shaft 7. This to and fro movement of the housing 13 together with the magnet 11 is controlled by an electric current through coil 12, which generates a desired electromagnetic field. The movement of the housing 13 forces the polygon facets 22(i) to make a tilting movement around the pivots 25(i). By the arrangement according to FIG. 7 subsequent segments of a helical scanning pattern may be generated. The lengths of each of those segments depend on the number of facets 22(i) used. The polygon facets 22(i) are shown to be separate parts fixed to the frames 24(i). However, it is also possible to provide each of the frame surfaces with reflective layers. Separate facets 22(i) may then be omitted.

Instead of pivots 5 (FIGS. 5 and 6) and 25(i) (FIG. 7), shown in the embodiments described above, spring components may be used.

In a first embodiment of the arrangement according to FIG. 7 the angle between the normal of the polygon facets 22(i) and the axis of rotation 63 is close to π/4 radians (45°) and the propagation path of the impinging laser beam 1 is substantially parallel to the axis of rotation 63. In this embodiment, which is shown in FIG. 7, by rotating and tilting the mirror facets 22(i) segments of a helical scanning pattern will be generated. However, then, the scanning speed equals the rotation speed of motor 8.

In a second, alternative embodiment (not shown) of the arrangement according to FIG. 7, the angle between the normal of the polygon facets 22(i) and axis of rotation 63 is close to π/2 radians and the propagation path of the impinging laser beam 1 is substantially perpendicular to the axis of rotation 63. By rotating the tilting the mirror facets 22(i), again, segments of a helical scanning pattern may be generated, however, the scanning speed being doubled relative to the rotation speed of motor 8. This latter mode of operation may be called "normal mode", whereas the mode of operation shown in FIG. 7 may be called the "parallel mode". Of course, the device shown in FIG. 7 may be operate din both mode.

FIG. 8 shows an arrangement comprising a scanning pattern generator according to any of the FIGS. 2–6 which meets the conditions mentioned above. A focused beam 1 is generated by a light source 41, such as a laser diode. The laser beam 1 passes through a small hole 42 of a mirror 43 and is reflected twice by mirrors 44, 45. By means of the helical scanning pattern generator 46, described in conjunction with FIGS. 2–6, a rotating reflected laser beam 3 is generated which leaves the bar code reader through a cylindrical window 47 of a housing 51. During operation, a helical scanning pattern is generated, for instance at the inside of a cylindrical object having a bar code 48. The bar code 48 will scatter the reflected laser beam 3 back to the rotating and tilting mirror of the helical pattern generator and to mirrors 45, 44, 43, to a collimator 49 and, then, to a sensor 50. The sensor 50 is connected to electronic analysing means (not shown), which are known to a person skilled in the art and which are not part of the present invention.

The arrangement shown in FIG. 7 may also be applied within the housing 51 of FIG. 6. Since, then, no entire helical scanning will be generated, window 47 does not need to surround the housing 51 entirely in that case. Of course, both in the latter arrangement and the arrangement according to FIG. 7 mirrors 44, 45 may be omitted and the laser source 41 may be situated at the left side of the device. However, in the device according to FIG. 7, then, the application of a motor with a hollow shaft through which the incident laser beam 1 propagates is preferred, since otherwise connecting wires (not shown) will disturb a continuous scanning pattern.

The helical pattern generator according to any of the FIGS. 2–7 may also be used in bar code readers reading bar codes on substantially flat surfaces as will be explained by reference to FIGS. 9–12.

To read bar codes, generally at least one of the generated scanning lines must pass over the entire code. However, in most situations it cannot be predicted what is the position of the bar code relative to the generated scanning pattern. Therefore, the generated scanning pattern preferably meets the following conditions:

1. at a given point in the scanning range the scanning pattern is expected to be star-like in order to be able to read a bar code with an arbitrary orientation in this point;
2. at a given direction the scanning pattern is expected to be a set of parallel scanning lines in order to allow the bar code to be read at any arbitrary position;
3. the distance between a bar code to be read and the scanning arrangement at which a bar code can properly be read is not critical.

Figure 9:
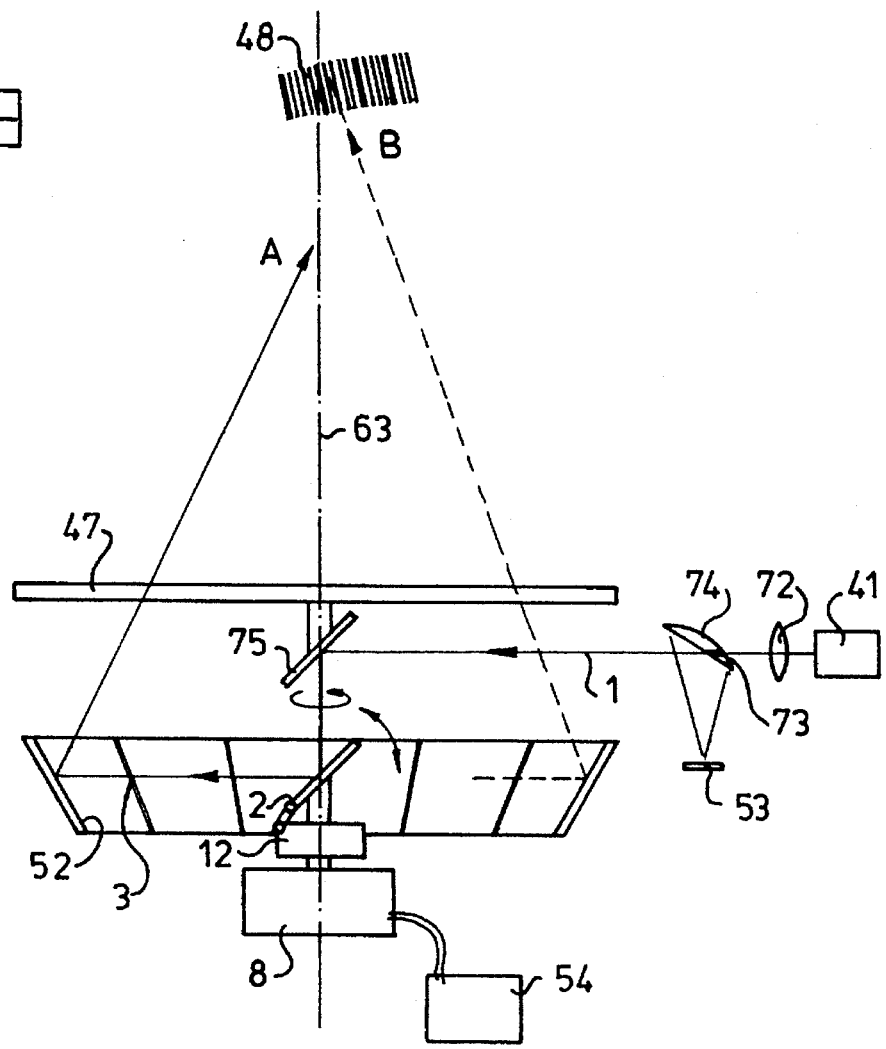
FIG. 9 shows another embodiment of a scanning apparatus provided with a helical scanning pattern generator according to any of the FIGS. 2–6, in which a mirror array is used.

A first embodiment of a bar code reader able to read bar codes at an arbitrary position and orientation, in which a helical scanning pattern generator according to any of the FIGS. 2–6 is used, is shown in FIG. 9. The device shown in FIG. 9, may be considered as a further development of the scanning device described in U.S. Pat. No. 4,699,447 in the sense that the FIG. 9 device offers more variable scanning lines to be generated.

A laser beam 1 is generated by a laser source 41 and focused by optics 42. The laser beam 1 passes through a small hole 73 of a reflective light collector 74 to a fixed mirror 75. Reflected by the fixed mirror 75 the laser beam 1 is directed to propagate along the axis of rotation 63 of motor 8, i.e. the axis of rotation of mirror 2 of the helical pattern generator. Laser beam 1 is, then, reflected by mirror 2 to generate reflected laser beam 3 which scans subsequent mirrors of a mirror array 52. The laser beam 3 will be reflected by the individual mirrors of the mirror array 52 through a window 47 to the bar code 48 to be read. In general, the rotation speed of the mirror 2 will be substantially higher than the tilting movement. The laser beam impinging upon the bar code 48 will be scattered back to the mirror array 52, the mirror 2, the mirror 75 and the light collecting mirror 74, and then be focused to a sensor 53.

Due to the rotation of the mirror 2 around the axis of rotation 63, the reflected laser beam 3 will scan, for instance, a star-like pattern in some fixed planes as shown by A and B in FIG. 9. By tilting the mirror 2, the scanning line will also be shifted transversely in the reading planes. In each single reading plane the scanning pattern will be variable as a function of the scanning time and depends on both the rotation speed of mirror 2 and the tilting speed of mirror 2. Both the tilting movement and the rotation speed of mirror 2 are controlled by an electric control unit 54.

Figure 10:
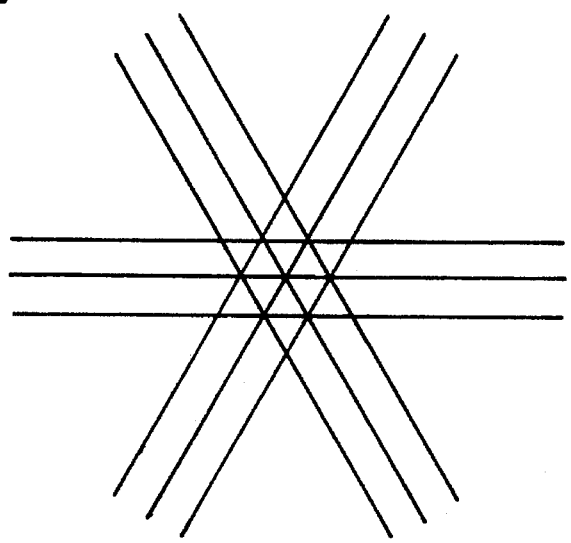
FIG. 10 shows some possible scanning patterns.

FIG. 10 shows a typical scanning pattern generated by the bar code reader shown in FIG. 9, in which the mirror array 52 has six reflective facets.

Figure 11:
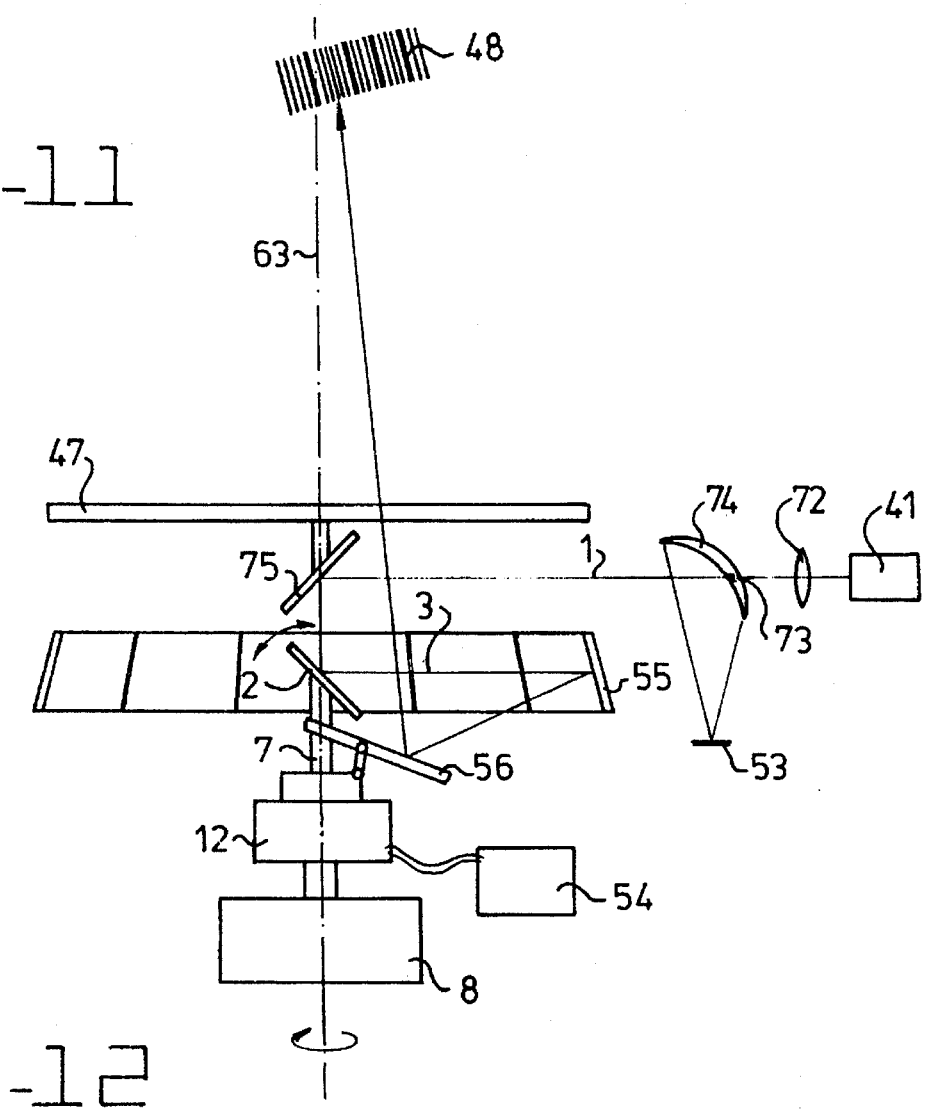
FIG. 11 shows another embodiment of a scanning apparatus provided with a helical scanning pattern generator according to any of the FIGS. 2–6, in which a mirror array is used.

A further embodiment of a bar code reader, according to the present invention able to read a bar code at an arbitrary position and orientation, is shown in FIG. 11.

The same reference numbers refer to the same elements of the bar code reader in FIG. 9. The main difference between the arrangements according to FIG. 11 and FIG. 9 is that instead of mirror array 52 another mirror array 55 is used, which does not reflect the reflected laser beam 3 directly to a bar code 48 to be read, but to an additional mirror 56. The additional mirror 56 is fixed to the rotation shaft 7 of motor 8 and has a predetermined angle of inclination to the rotation shaft 7. Reflected by the second mirror 56 the laser beam scans the bar code 48 through window 47.

Figure 12:
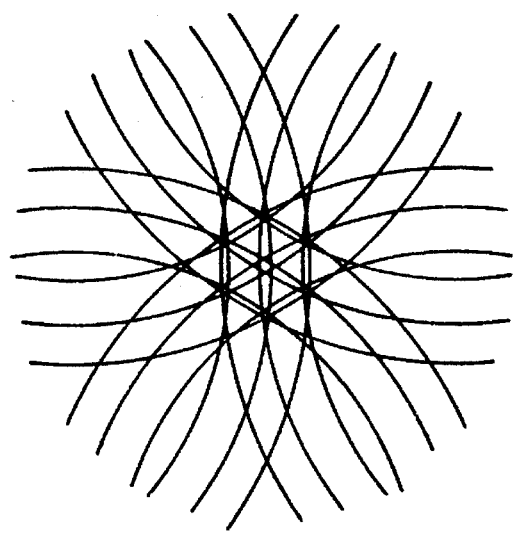
FIG. 12 shows some scanning patterns that may be generated by the apparatus shown in FIG. 11.

The laser beam scattered by the bar code, is reflected by mirror 56, the mirror facets of mirror array 55, mirror 2, mirror 75 and the light collecting mirror 74 to sensor 53. Due to the rotation of mirrors 2 and 56 around the axis of rotation 63, the laser beam directed to the bar code will scan a star-like pattern in its entire longitudinal range. Since mirror 2 is making a tilting movement scanning lines will be shifted from the axis of rotation 63. In each single reading plane, the scanning pattern will be shifted as a function of the scanning time. A typical scanning pattern that might be generated by the bar code reader according to FIG. 11 is shown in FIG. 12. The actual scanning pattern depends upon the rotation speed and the tilting speed of mirror 2, both being controlled by the electric control unit 54.

In the arrangement according to FIG. 11 the distance between the bar code 48 and the bar code reader at which the bar code 48 may properly be read is less critical. This is further explained in European patent application EP-A-0 551,666.

In the arrangement according to FIG. 11 mirror 2 may be replaced by a mirror 2 having a fixed angle of inclination with respect to the axis of rotation 63, whereas, then, the additional mirror 56 is replace by a mirror able to be tilted during rotation.

Figure 13:
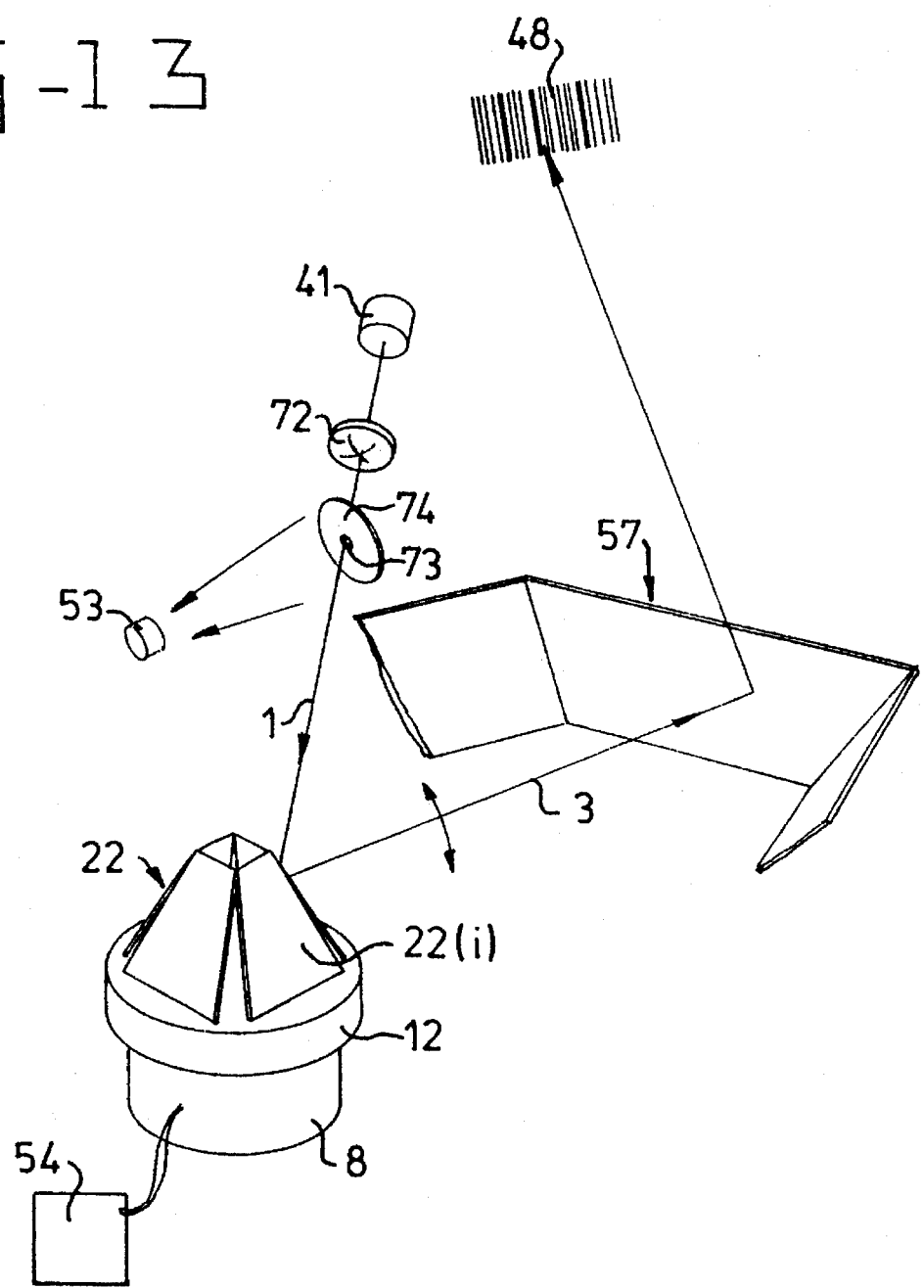
FIG. 13 shows an alternative embodiment of the present invention as shown in FIGS. 9 and 11, in which the scanning pattern generator of FIG. 7 is used.

In the arrangements according to FIGS. 9 and 11, the helical scanning pattern generator having only one rotatable and tiltable mirror 2 may be replaced by polygon 22 having tiltable and rotatable facets 22(i) according to FIG. 7. Such an arrangement in schematically shown in FIG. 13, where the mirror array 52, 55 is replace by a mirror array 57 not entirely surrounding the polygon 22, since the reflected beam 3 will only be able to generate segments of a helical scanning pattern, as described above.

Figure 14:
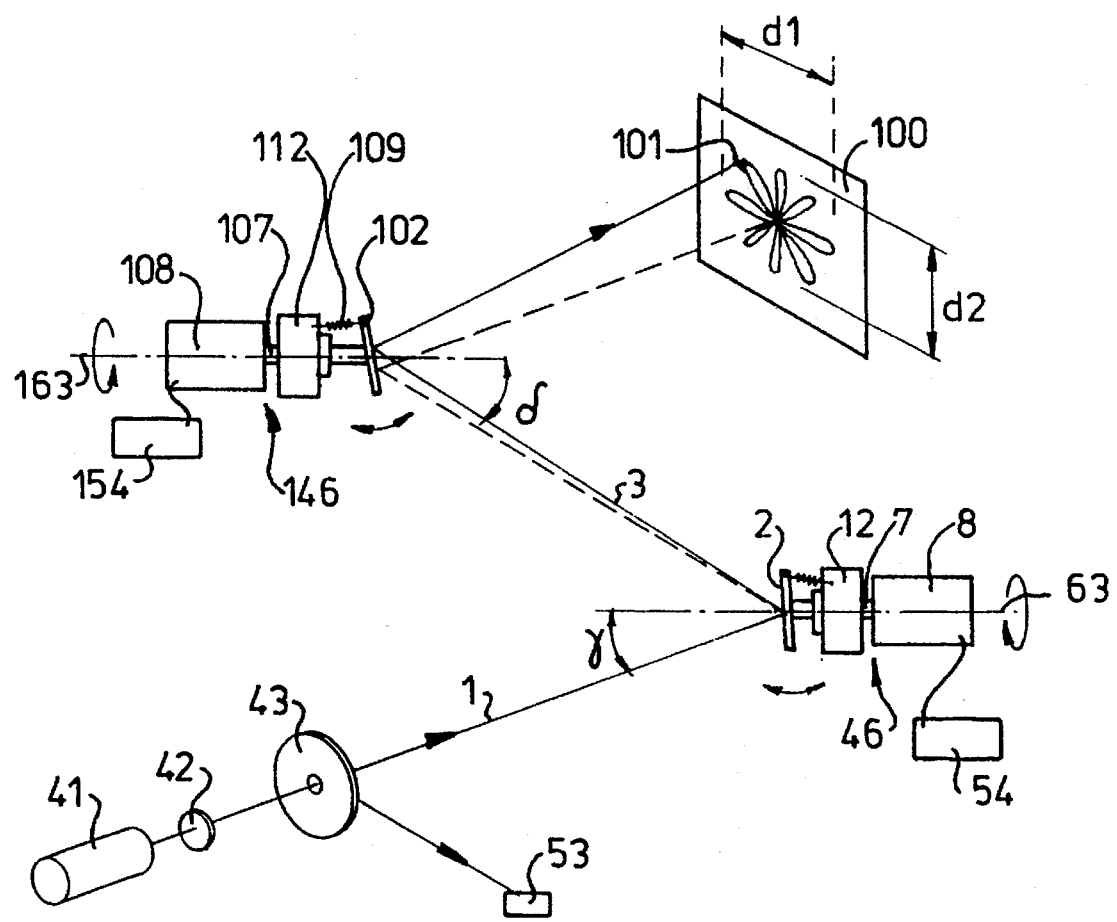
FIG. 14 shows an embodiment comprising two helical scanning apparatuses according to any of the FIGS. 2 to 6.

A further embodiment of the present invention comprising two helical scanning pattern generators according to any of the FIGS. 2–6 is shown in FIG. 14, which may be considered as a further development of scanning devices shown in U.S. Pat. No. 4,871,904 in the sense that the size of the scanning pattern may be controlled. The first helical scanning pattern generator 46, during operation, receives an incident light beam 1, which is reflected by rotatable and tiltable mirror 2 to second helical scanning pattern generator 146. The second helical scanning pattern generator 146 comprises a rotatable and tiltable mirror 102, which is driven by rotation driving means, i.e. a motor 108 and a rotation shaft 107, and tilting driving means 109. The mirror 102 receives the reflected beam 3 from mirror 2 of the first helical scanning pattern generator 46. By further reflecting the incident beam 3 a scanning pattern 102 on a surface 100 will be generated. In the embodiment of FIG. 14, the incident light beam 1 does not propagate along the axis of rotation 63 of the first helical scanning pattern generator 46, but impinges upon the mirror 2 by an angle of inclination $\gamma$ relative to the axis of rotation 63. Therefore, the reflected beam 3 propagates along a conic scanning surface and generates a substantially circular scanning pattern upon mirror 102 of the second helical scanning pattern generator 146. The conic angle and the speed of rotation of reflected light beam 3 depend on the rotation speed of the mirror 2, caused by the motor 8 which is controlled by electric control unit 54, and on the tilting movement of mirror 2, also controlled by electric control unit 54. The rotating speed of mirror 102 is determined by the speed of rotation of motor 108 which is controlled by a further electronic control unit 154. The control unit 154 also controls the tilting movement of the mirror 102.

By varying the angle of inclination between the surface of mirror 2 and the axis of rotation 63 the angle of inclination $\delta$ between the reflected light beam 3 and the axis of rotation 163 of the second helical scanning pattern generator 146 can be controlled. By the independent control of the rotation speed of mirror 2, the rotation speed of mirror 102, the tilting movement of mirror 2 and the tilting movement of mirror 102, the generated scanning pattern 101 on the surface 100 may be controlled. Especially, the height d2 of the scanning pattern 101 and the width d1 of the scanning pattern may be varied by controlling these variables. The desired height d2 and width d1 vary in dependence on the distance between a bar code to be read and the scanning apparatus. For short range bar code reading the scanning field is expected to be rather large, whereas for long range reading the scanning field is to be expected rather small.

It may be clear to a person skilled in the art that the present invention is not restricted to the embodiments shown in the figures. It is only essential to the present invention that there is provided at least one mirror that may be rotated by rotating means and at the same time be tilted independently by tilting means. The tilting means are in no way restricted to electromagnetic driving means.

The use of a laser beam is preferred, however, the invention is not restricted to such a light beam.

I claim:

1. A scanning apparatus to scan an object by means of a light beam, the apparatus comprising at least one mirror, which, during operation, is driven by driving means to make a combined movement of a continuous unidirectional rotation about a fixed axis of rotation and an oscillating movement relative to said axis of rotation, said driving means comprising rotation driving means and oscillating driving means, both said rotation and said oscillating driving means being controlled by control means in such a way that the continuous rotation and oscillating movements of said at least one mirror are controlled independently, the rotation driving means being located in a fixed position for rotating said at least one mirror unidirectional about said fixed axis of rotation and said oscillating driving means oscillating only said at least one mirror.

2. A scanning apparatus according to claim 1 wherein, during operation, the light beam incident upon the mirror propagates substantially along the axis of rotation of the mirror.

3. A scanning apparatus according to claim 1 wherein the apparatus comprises a rotatable polygon having N tiltable, reflective facets and wherein, during operation, the light beam incident upon subsequent facets of the polygon propagates along a path substantially parallel to the axis of rotation of said polygon.

4. A scanning apparatus according to claim 1 wherein the apparatus comprises a rotatable polygon having N tiltable, reflective facets and wherein, during operation, the light beam incident upon subsequent facets of the polygon propagates along a path substantially perpendicular to the axis of rotation of said polygon.

5. A scanning apparatus according to claim 1 wherein the oscillating driving means comprises a spring means.

6. A scanning apparatus according to claim 1 wherein the mirror is tiltable around first pivoting means and the oscillating driving means comprises first magnet means connected to the mirror and means to exert a magnetic force on the first magnet means in order to move them in an axial direction relative to the axis of rotation.

7. A scanning apparatus according to claim 6 wherein the means to exert a magnetic force on the first magnet means comprises a coil to be activated by an electric current.

8. A scanning apparatus according to claim 6 wherein the means to exert a magnetic force on the first magnet means comprises second magnet means driven by further driving means to drive said second magnet means in a direction substantial parallel to the axis of rotation.

9. A scanning apparatus according to claim 1, comprising a housing surrounding the mirror and the driving means and comprising a window at least partially surrounding the mirror allowing the light beam to generate at least segments of a helical scanning pattern on the object to be scanned after being reflected by the mirror.

10. A scanning apparatus according to claim 1, comprising a mirror array surrounding the mirror to receive the light beam after being reflected by the mirror in order to generate a scanning pattern on the object to be scanned.

11. A scanning apparatus according to claim 10, comprising a mirror array surrounding the mirror to receive the light beam after being reflected by the mirror and a further mirror, which is rotatable around the axis of rotation and arranged to receive the light beam after being reflected by the mirror array in order to generate a scanning pattern on an object to be scanned.

12. A scanning apparatus according to claim 1, comprising a further rotatable, tiltable mirror connected to further rotation driving means and to further oscillating driving means, both said further rotation and oscillating driving means being controlled by further control means, wherein, during operation, the light beam is directed to the mirror along a path having a first angle of inclination relative to the axis of rotation of said mirror in order to generate a reflected light beam which propagates along a conic surface to the further mirror, which reflects said reflected light beam in order to generate a scanning pattern the height and the width of which being variable by varying at least one of the variables selected from the following group of variables: rotation speed of the mirror, rotation speed of the further mirror, oscillating movement of the mirror, and oscillating movement of the further mirror.

13. A scanning apparatus to scan an object by means of a light beam, the apparatus comprising at least one mirror, which, during operation, is driven by driving means to make a combined movement of a continuous, unidirectional rotation about a fixed axis of rotation about at least 360° and an oscillating movement relative to said axis of rotation, said driving means comprising rotation driving means and oscillating driving means, both said rotation and said oscillating driving means being controlled by control means in such a way that the continuous rotation and oscillating movements of said at least one mirror are controlled independently, the rotation diving means being located in a fixed position for rotating said at least one mirror about said fixed axis of rotation and said oscillating driving means oscillating only said at least one mirror.

* * * * *